2,994,669
PROCESS FOR THE PRODUCTION OF MODIFIED PHENYLENE DIAMINE ION EXCHANGE RESINS
Heinrich Häder, Wolfen, Germany, assignor to VEB Farbenfabrik Wolfen, Bitterfeld, Germany
No Drawing. Filed Aug. 28, 1959, Ser. No. 836,625
2 Claims. (Cl. 260—2.1)

The present invention relates to a process for producing ion exchange resins, more particularly to be used as adsorbents.

According to known methods, some ion exchange resins to be used as adsorbents are made by the condensation of polyamines or polyimines with aldehydes, especially formaldehyde, in a medium of hydrochloric acid. A preferred amine for condensation is m-phenylene diamine, which is subjected to condensation with formaldehyde at the approximate molar ratio 3.5:7.5.

The resins obtained by the above mentioned condensation with formaldehyde are very useful agents for the purification and conditioning of drinking water and water used for industrial purposes. Among the treatments carried out with the resins are, e.g., demineralization, such as removal of iron or chlorine from water; other uses are the decolorization of sugar solutions, for instance, beet sugar, cane sugar, and invert sugar solutions, as well as of hydrolyzed starch. Yet another use is the purification of metal salt solutions and the iron removal from aqueous ammonia. These are, however, only a few of the diversified applications for the ion exchange resins which are a group of agents of growing importance in many fields of applied chemistry.

To a large extent, the activity of the ion exchange resins is based on their excellent properties of adsorption. The adsorption value may be determined by the decoloration of molasses solutions. The value is, e.g., for m-phenylene diamine formaldehyde resins in the order of 1500 to 1800 cc. per 100 cc. resin.

The present invention is based on the unexpected discovery that ion exchange resins having far superior adsorptive capacity can be made from m-phenylene diamine formaldehyde resins by combining them during the synthesis of the resin with a further reaction component by replacing a part of the m-phenylene diamine used up to now by m-aminophenol, naphthylamine or 2,2'-diamino-1,1'-dinaphthyl.

Generally stated, the process is carried out by subjecting to a condensation reaction m-phenylene diamine and formaldehyde in the approximate molar ratio of 2–3:5–8 in an acid medium, while substituting a portion of the m-phenylene diamine by one of the above-mentioned amines.

The adsorption value of the resins thus produced amounts to several times the value for the abovementioned pure m-phenylene diamine formaldehyde resin, with other properties such as mechanical strength remaining equal.

It has been found that the presence of one of three components mentioned is one factor in effecting the increase of the adsorption value; another factor is the amount of hydrochloric acid present which is necessary for the synthesis and which may be increased up to 20 parts by weight of HCl of 32% by weight for 10 parts by weight of the amines present. A further increase in hydrochloric acid endangers the production of the resins according to the invention, because it accelerates the condensation to assume an excessive rate.

It has further been found that, contrary to previous beliefs, an increase in the amount of water present in the condensation reaction impairs the adsorptive power of the resins.

In the following, a number of examples is given which illustrate the present invention and in which the water is adjusted to optimum amounts. The first three examples demonstrate the increase in absorptive capacity with increasing amounts of hydrochloric acid.

The resins according to the invention are used in the same fields as the m-phenylene diamine formaldehyde resins, but they exhibit by far greater adsorptive capacities, as stated above.

In the examples all parts are given by weight where not otherwise indicated.

Example 1

27 parts m-phenylene diamine and 13.6 parts m-aminophenol are dissolved in 32 parts of 32% by weight hydrochloric acid and 150 parts water. The solution is cooled down to 5° C. and 75 parts of 30% formaldehyde are added, which causes the temperature to rise to 45° C. The condensation is completed after two minutes and the resin obtained in solid form undergoes a known after-treatment of crushing, washing and treating with steam. The resins are stored in moist condition in order not to lose their adsorptive capacity.

The adsorption value of the resin after four applications is 1875 cc. of the colored solution, i.e., 1875 cc. of molasses solution are decolorized by 100 cc. resin.

Example 2

The condensation is carried out as described in Example 1 with the following components:

27 parts m-phenylene diamine
13.6 parts m-aminophenol
53 parts 32% hydrochloric acid
150 parts water and
75 parts 30% formaldehyde The adsorption value of the resin after four applications is 4370 cc. of the colored solution per 100 cc. resin.

Example 3

The condensation is carried out as described in Example 1 with the following components:

27 parts m-phenylene diamine
13.6 parts m-aminophenol
55 parts 32% hydrochloric acid
150 parts water and
75 parts 30% formaldehyde.

The adsorption value of the resin after four times of application is 4800 cc. of the colored solution per 100 cc. resin.

The adsorption value of the corresponding pure m-phenylene diamine formaldehyde resin only amounts to about 1630 cc. of the colored solution.

Example 4

The condensation is carried out as described in Example 1 with the following components:

27 parts m-phenylene diamine
3 parts β-naphthylamine
40 parts 32% hydrochloric acid
150 parts water and
53 parts formaldehyde Adsorption value after four applications: 4080 cc. of the colored solution per 100 cc. resin.

Example 5

27 parts m-phenylene diamine and 3.8 parts 2,2'-diamino-1,1'-dinaphthylchlorohydrate are dissolved in 100 parts water and 40 parts of 32% hydrochloric acid, 24 parts methanol being added as solubilizing agent. The solution is cooled down to 5° C. and 53 parts of 30% formaldehyde are added whereupon the reaction temperature rises to 45° C. The condensation which is completed after a few minutes results in a solid resin which undergoes the known aftertreatment.

Adsorption value after four applications: 4220 cc. of the colored solution per 100 cc. resin.

As a general rule it may be stated that already a few percent of one of the amines named above when substituted for m-phenylene diamine in the condensation product will cause a substantial increase in the adsorption value, while as an upper limit I may mention a replacement of up to about 60% of the m-phenylene diamine in the condensation product.

It should, however, be understood that the foregoing disclosure relates only to preferred embodiments of the invention and that it is intended to cover all changes and modifications of the examples which do not constitute departures from the spirit and scope of the invention as set forth in the appended claims.

What is claimed is:

1. A process for producing an ion exchange resin to be used as adsorbing agent, which comprises subjecting to a condensation reaction m-phenylene diamine and formaldehyde in the approximate molar ratio of 2–3:5–8 in an acid medium while substituting a portion of the m-phenylene diamine in an amount of up to 60% by weight by an amine compound selected from the group consisting of m-aminophenol, naphthylamine and 2,2'-diamino-1,1'-dinaphthyl.

2. The process as claimed in claim 1 which comprises carrying out the condensation reaction in the presence of hydrochloric acid in the ratio of up to 20 parts by weight of HCl of 32 percent by weight:10 parts by weight of the amine components.

References Cited in the file of this patent

UNITED STATES PATENTS

| | | |
|---|---|---|
| 2,582,849 | Raymondt | Jan. 15, 1952 |
| 2,588,784 | Whittaker | Mar. 11, 1952 |
| 2,671,059 | Smit | Mar. 2, 1954 |